US012429177B2

(12) United States Patent
Van Bommel et al.

(10) Patent No.: US 12,429,177 B2
(45) Date of Patent: Sep. 30, 2025

(54) LED LIGHT UNIT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/036,226

(22) PCT Filed: Nov. 9, 2021

(86) PCT No.: PCT/EP2021/081003
§ 371 (c)(1),
(2) Date: May 10, 2023

(87) PCT Pub. No.: WO2022/101152
PCT Pub. Date: May 19, 2022

(65) Prior Publication Data

US 2024/0019092 A1 Jan. 18, 2024

(30) Foreign Application Priority Data

Nov. 10, 2020 (EP) .................................... 20206649

(51) Int. Cl.

| | |
|---|---|
| ***F21S 4/22*** | (2016.01) |
| ***F21Y 107/70*** | (2016.01) |
| ***F21Y 115/10*** | (2016.01) |

(52) U.S. Cl.
CPC ............ *F21S 4/22* (2016.01); *F21Y 2107/70* (2016.08); *F21Y 2115/10* (2016.08)

(58) Field of Classification Search
CPC ............ F21Y 2107/30; F21Y 2107/00; F21Y 2107/70; F21Y 2103/30; F21Y 2103/33;
(Continued)

(56) References Cited

U.S. PATENT DOCUMENTS

| | | | |
|---|---|---|---|
| 6,580,228 B1 | 6/2003 | Chen et al. | |
| 7,086,756 B2 * | 8/2006 | Maxik ....................... | F21K 9/90 362/800 |

(Continued)

FOREIGN PATENT DOCUMENTS

| | | |
|---|---|---|
| EP | 2778503 A2 | 9/2014 |
| JP | 4815381 B2 | 11/2011 |
| WO | 2019038222 A1 | 2/2019 |

*Primary Examiner* — William J Carter

(57) ABSTRACT

The present invention describes a LED light unit (1) for providing LED light, the LED light unit (1) comprising a flexible printed circuit board (PCB) (2) having a first longitudinal axis (LA1) and a plurality of elongated light sources (3) each having a second longitudinal axis (LA2). The plurality of elongated light sources (3) is arranged on the flexible PCB (2) such that none of the second longitudinal axes (LA2) of the plurality of elongated light sources (3) is parallel to the first longitudinal axis (LA1) of the flexible PCB (2). The LED light unit further comprises a carrier (4), wherein the flexible PCB (2) is bent along the first longitudinal axis (LA1) such that each of the elongated light sources (3) is arranged in the shape of a substantially circular arc, and wherein the flexible PCB (2) is subsequently at least partially attached to the carrier (4).

10 Claims, 4 Drawing Sheets

(58) Field of Classification Search
CPC ............. F21Y 2105/12; F21Y 2107/10; F21Y 2107/20; F21Y 2107/50; F21Y 115/10; F21S 4/22
See application file for complete search history.

(56) References Cited

U.S. PATENT DOCUMENTS

| | | | | |
|---|---|---|---|---|
| 9,353,937 | B2 * | 5/2016 | Hussell | F21V 29/65 |
| 10,767,816 | B1 * | 9/2020 | Wu | F21K 9/232 |
| 2004/0037079 | A1 | 2/2004 | Luk | |
| 2005/0162850 | A1 * | 7/2005 | Luk | H05B 45/20 362/227 |
| 2014/0321126 | A1 * | 10/2014 | Narag | F21V 21/14 362/306 |
| 2017/0082251 | A1 | 3/2017 | Tannahill et al. | |

* cited by examiner

LED LIGHT UNIT

CROSS-REFERENCE TO PRIOR APPLICATIONS

This application is the U.S. National Phase application under 35 U.S.C. § 371 of International Application No. PCT/EP2021/081003, filed on Nov. 9, 2021, which claims the benefit of European Patent Application No. 20206649.4, filed on Nov. 10, 2020. These applications are hereby incorporated by reference herein.

TECHNICAL FIELD

The present invention relates to a LED light unit for providing LED light, the LED light unit comprising a flexible printed circuit board (PCB), a plurality of elongated light sources and a carrier. The present invention further relates to a lighting device comprising such a LED light unit, as well as to a method of manufacturing such a LED light unit.

BACKGROUND

The use of light emitting diodes, LEDs, for illumination purposes continues to attract attention. Compared to incandescent lamps, fluorescent lamps, neon tube lamps, etc., LEDs provide numerous advantages such as longer operational life, reduced power consumption, and increased efficiency related to the ratio between light energy and heat energy. For this reason, incandescent lamps are rapidly being replaced by LED based lighting solutions. It is nevertheless appreciated and desired by users to have LED based light sources which resemble an incandescent bulb. For this purpose, it is possible to make use of the infrastructure for producing incandescent lamps based on glass and replace the filament with LEDs. One of the concepts is based on LED filaments placed in such a bulb. The appearances of these lamps are highly appreciated as they look very decorative.

It is however desired to obtain a LED light unit having an improved aesthetical appearance while reducing cost and improving assembly of the LED light unit. Further, it is desirable to provide LED light unit suitable for luminaires.

In EP 2778503 a light emitting diode (LED) lighting device is disclosed that includes at least one LED assembly comprising a substrate and two or more LEDs configured to generate light spaced apart along the substrate. A cured structural coating is disposed on at least a portion of the LED assembly, wherein the cured structural coating is configured to maintain the LED assembly in a predetermined shape. The substrate of the LED assembly may comprise an elongated and/or flexible substrate.

SUMMARY

In view of the above discussion, the purpose of the present invention is to provide a LED light unit which is particularly suitable for luminaires, and which provides improved appearance and assembly as well as low manufacturing costs.

The present invention thus provides a LED light unit for providing LED light, the LED light unit comprising:

- a flexible printed circuit board (PCB) having a first longitudinal axis,
- a plurality of elongated light sources each having a second longitudinal axis; wherein the plurality of elongated light sources is arranged on the flexible PCB such that none of the second longitudinal axes of the plurality of elongated light sources is parallel to the first longitudinal axis of the flexible PCB, and
- a carrier,
- wherein the flexible PCB is bent along the first longitudinal axis such that each of the elongated light sources is arranged in the shape of a substantially circular arc, and wherein the flexible PCB is subsequently at least partially attached to the carrier.

An advantage of the LED light unit of the present invention is that a spiral-like appearance is achieved by a simple structure, using separate relatively short elongated light sources rather that one continuous LED filament that as to be arranged into a spiral shape by bending, folding, twisting or the like. Another advantage of the LED light unit of the present invention is that the spiral-like appearance is achieved by a compact structure, requiring less space than a true spiral, which makes the LED light unit of the present invention particularly suitable for use in flat lighting devices, such as luminaires, without compromising the aesthetical appearance.

The term "LED" as used in the context of the present invention implies any type of LED known in the art, such as inorganic LED(s), organic LED(s), polymer/polymeric LEDs, violet LEDs, blue LEDs, optically pumped phosphor coated LEDs, optically pumped nano-crystal LEDs. As used herein, the term "LED" can encompass a bare LED die arranged in a housing, which may be referred to as a LED package.

By the term "flexible" is meant that the PCB may be arranged into different shapes by bending, folding, twisting, or any combination of these. Further, the term "flexible" means that the shape of the PCB may be malleable or adaptable.

Preferably, the PCB has substantially rectangular shape. Further, the PCB of the present invention may be substantially elliptical, triangular, or any other suitable shape. The first longitudinal axis runs parallelly with the longitudinal extension of the PCB, preferably through the central portion of the PCB.

The flexible PCB may be made of any suitable material, such as plastic. Moreover, the flexible PCB may be made of a light transmissive material.

The term "elongated light source" means a light source having a longitudinal extension and a width, such that the longitudinal extension is greater than the width. The elongates light sources may have the same shape or may be of different shapes. The elongated light sources may be substantially rectangular, elliptical, triangular or the like. The second longitudinal axis of each of the elongated light sources runs parallel with the longitudinal extension of the elongated light source, preferably through the central portion of the elongated light source. The plurality of elongated light sources may be mechanically and electrically connected. The electrical connection may be in parallel and/or in series.

Each of the elongated light sources may comprise a LED filament and a plurality of LEDs. The LED filament may be arranged to support the plurality of LEDs. The LED filament is preferably formed of a flexible material, e.g. a polymer such as polyamide. Moreover, the LED filament may comprise electrodes for electrically connecting the plurality of LEDs.

The LED light unit according to the present invention may comprise at least three elongated light sources, preferably at least four elongated light sources, more preferably at least five elongated light sources.

The plurality of LEDs of each of the elongated light sources may comprise at least 10 LEDs, preferably at least 15 LEDs, more preferably at least 20 LEDs.

At least one of the elongated light sources of the present invention may comprise an encapsulant. In particular, the plurality of LEDs of at least one of the elongated light sources may be encapsulated by an encapsulant comprising a luminescent material and/or light scattering material. By the term "encapsulant", it is here meant a material, element, arrangement, or the like, which is configured or arranged to at least partially surround, encapsulate and/or enclose the plurality of LEDs of at least one of the elongated light sources. Therefore, such an embodiment is advantageous in that it provides additional protection to the LEDs increasing the longevity of the luminaire or lighting device in which the LED light unit is used.

The luminescent material of the encapsulant may at least partly convert direct LED light originating from the LEDs into converted light. The converted light and/or the direct LED light may be understood as LED light.

The encapsulant may comprise wavelength converting material configured to convert at least a part of light input therein into light having a selected wavelength range. The encapsulant may, preferably, cover at least 90% of the plurality of LEDs.

As mentioned above, the plurality of elongated light sources is arranged on the flexible PCB such that none of the second longitudinal axes of the plurality of elongated light sources is parallel to the first longitudinal axis of the flexible PCB. In particular, the angle between each of the second longitudinal axes of the elongated light sources and the first longitudinal axis of the flexible PCB may be between 5 and 85 degrees.

The LED light unit according to the present invention comprises a carrier for at least partially supporting the flexible PCB. As mentioned above, the flexible PCB is bent along the first longitudinal axis such that each of the elongated light sources is arranged in the shape of a substantially circular arc, and is subsequently at least partially attached to the carrier. The attachment of the bent flexible PCB to the carrier may be performed by any suitable method known to the person skilled in the art, such as by means of glue, weld, screws, rivets or the like.

The carrier may comprise at least one flat surface, to which the flexible PCB is at least partially attached.

The term "circular arc" may be understood as, for example, a circular sector or a circular segment. The circular arc may have a constant radius. A central angle of a circular sector defined by the circular arc may be at least 180 degrees. The central angle of a circular sector defined by the circular arc may be between 200 and 360 degrees, preferably between 200 and 340 degrees.

It should be noted that once the flexible PCB has been bent and attached to the carrier, the second longitudinal axis of each of the plurality of elongated light sources will be formed by the projection of the elongated light source to the plane of the carrier.

Thus, according to the present invention, the LED light unit will be perceived as comprising a LED filament having a spiral shape, since each of the elongated light sources will be arranged as a circular arc. On the other hand, the assembly of the LED light unit of the present invention is significantly simplified and the cost is reduced compared to providing a true spiral. Also, the structure of the LED light unit of the present invention is very compact.

Each circular arc may be substantially perpendicular to the plane of the carrier. However, it is to be understood that each circular arc may be arranged at an angle to the plane of the carrier, wherein the angle may be from 1 to 45 degrees. In such an embodiment, the space required for arranging the LED light unit in a lighting device is decreased even further.

According to the present invention, at least some of the plurality of the elongated light sources being arranged on the flexible PCB may be parallel to each other. Preferably, all the elongated light sources are parallel to each other. Such an arrangement further augments the spiral-like appearance of the LED light unit.

At least two adjacent light sources of the plurality of the elongated light sources may be arranged at a distance from each other, such that a spacing area is formed on the flexible PCB between the two adjacent elongated light sources. Preferably, each two adjacent light sources of the plurality of the light sources are arranged at a distance from each other, thus forming a plurality of spacing areas. The distance between each two adjacent elongated light sources may be constant, and may be between 0.3-10 cm, preferably 0.5-5 cm, more preferably 1-2 cm.

The spacing areas formed on the flexible PCB between each two elongated light sources may at least be semitransparent. By the term "semitransparent" is in the context of the present invention meant "imperfectly transparent", or "transparent to a certain degree", such as not all the light directed to the surface of the spacing area is transmitted through the spacing areas. Moreover, the spacing areas may be translucent, thus permitting the passage of light. The term "translucent" in the context of the present invention includes a material able to transmit and diffuse light so that objects beyond cannot be seen clearly. Further, the spacing areas formed between each two adjacent elongated light sources may be transparent, such that all the light is transmitted without appreciable scattering so that bodies lying beyond are seen clearly. Preferably, the spacing areas are transparent, such that perception of the LED light unit as comprising a spirally-shaped LED filament is enhanced.

Transparency of the spacing areas may be achieved by using a suitable material, such as transparent plastic material. Alternatively, transparency of the spacing areas may be achieved by removing the PCB material in the spacing areas, i.e. forming cut-outs between each two adjacent light sources.

Preferably, the spacing areas allow a higher degree of light transmission compared to the material of the flexible PCB.

According to the present invention, the carrier may comprise a specular reflecting surface. The specular reflecting surface may cover the entire surface of the carrier to which the flexible PCB is attached. By providing such a specular reflecting surface, each of the elongated light sources being in the shape of a circular arc in a manner disclosed above will be reflected by the reflecting surface, thus creating a closed loop. Thus, the LED light unit comprising such a reflecting surface will have an enhanced spiral-shaped appearance.

In order to improve the spiral-shaped appearance of the LED light unit even further, the specular reflecting surface of the carrier may be concave.

According to the present invention, a lighting device is provided, comprising a LED light unit as described above. Such a lighting device preferably comprises a housing comprising a light exit window arranged such that the plurality of elongated light sources is visible through the light exit window. The light exit window may be arranged such that it is parallel to the surface of the carrier. The carrier may be an integral part of the housing. By such an arrangement, the user will perceive the lighting device as comprising a substantially spiral-shaped LED filament, despite the fact that the LED light unit comprises a plurality of elongated light sources rather than a continuous spiral-shaped LED filament. Thus, the LED light unit of the present invention provides a spiral-like LED filament having a simple structure and thus low manufacturing costs.

Preferably, the lighting device according to the present invention is a flat luminaire for indoor or outdoor use, having a housing having rectangular or square cross-section.

According to the present invention, a method of manufacturing a LED light unit for providing LED light is described, the method comprising the steps of:

a) providing a flexible printed circuit board (PCB) having a first longitudinal axis;
b) providing a plurality of elongated light sources each having a second longitudinal axis;
c) arranging the plurality of elongated light sources on the flexible PCB such that none of the second longitudinal axes of the plurality of elongated light sources is parallel to the first longitudinal axis of the flexible PCB;
d) providing a carrier;
e) bending the flexible PCB along the first longitudinal axis such that each of the elongated light sources is arranged in the shape of a substantially circular arc;
f) at least partially attaching the flexible PCB to the carrier.

As already mentioned above, the method of the present invention provides a LED light unit that has a spiral-like appearance, while the assembly of the LED light unit is simplified, and the manufacturing costs are reduced. Indeed, the method of the present invention eliminates the need for providing a continuous LED filament that needs to be arranged into a spiral shape by folding, bending, twisting or the like. Moreover, the method of the present invention provides a LED light unit resembling a spiral, but at the same time having a compact structure that requires less space compared to a true spiral, which makes the method of the present invention particularly suitable when manufacturing LED light units for flat lighting devices, such as flat luminaires.

BRIEF DESCRIPTION OF THE DRAWINGS

Embodiments of the invention will now be described by way of example with reference to the accompanying drawings, of which.

Figure 1:
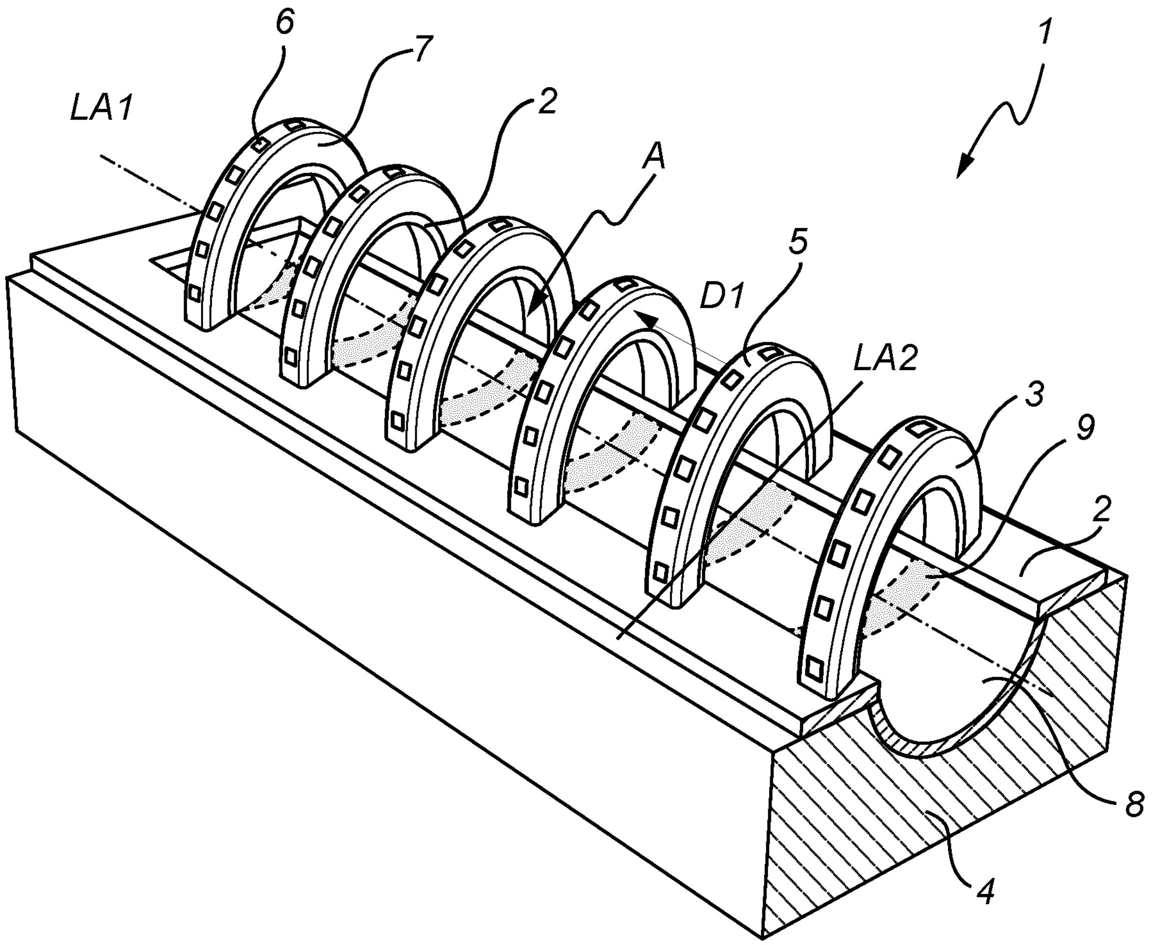
FIG. 1 is a perspective view of a LED light unit according to an exemplifying embodiment of the present invention.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 illustrates a LED light unit 1 according to the present invention. The LED light unit 1 comprises a flexible printed circuit board (PCB) 2 having a first longitudinal axis LA1, a plurality of elongated light sources 3 each having a second longitudinal axis LA2. The plurality of elongated light sources 3 is arranged on the flexible PCB 2 such that none of the second longitudinal axes LA2 of the plurality of elongated light sources 3 is parallel to the first longitudinal axis LA1 of the flexible PCB 2. The LED light unit 1 further comprises a carrier 4, wherein the flexible PCB 2 is bent along the first longitudinal axis LA1 such that each of the elongated light sources 3 is arranged in the shape of a substantially circular arc, and wherein the flexible PCB 2 is subsequently attached to the carrier 4.

As mentioned above, an advantage of the LED light unit 1 shown in FIG. 1 is that a spiral-like appearance is achieved by a simple structure, using separate relatively short elongated light sources 3 rather that one continuous LED filament that as to be arranged into a spiral shape by bending, folding, twisting or the like. Another advantage of the LED light unit 1 of the present invention is that the spiral-like appearance is achieved by a compact structure, requiring less space than a true spiral, which makes the LED light unit 1 of the present invention particularly suitable for use in flat lighting devices, such as luminaires, without compromising the aesthetical appearance.

The PCB 2 has substantially rectangular shape. The first longitudinal axis LA1 runs parallel with the longitudinal extension of the PCB 2 through the central portion of the PCB 2.

The LED light unit 1 comprises six elongated light sources 3. Each of the elongated light sources 3 comprises a LED filament 7 and a plurality of LEDs 6, supported by the LED filament 7. Each of the elongated light sources 3 shown in FIG. 1 further comprises an encapsulant 5.

As is evident from FIG. 1, the LED light unit 1 resembles a shape of a spiral.

As may be seen in FIG. 1, the plurality of the elongated light sources 3 are arranged on the flexible PCB 2 such that they are parallel to each other. Each circular arc is perpendicular to the plane of the carrier 4.

Each two adjacent light sources 3 are arranged at a distance D1 from each other, such that a plurality of spacing areas A is formed in the flexible PCB 2. The distance D1 between each two adjacent elongated light sources 3 is constant. Such an arrangement further augments the spiral-like appearance of the LED light unit.

As shown in FIG. 1, the spacing areas A formed in the flexible PCB 2 between each two elongated light sources 3 are transparent and are formed by removing the PCB material in the spacing areas, i.e. forming cut-outs between each two adjacent light sources 3. It should be noted that the PCB material is still present in circular arcs formed by the elongated light sources 3.

The spacing areas A thus allow a higher degree of light transmission compared to the material of the flexible PCB 2.

As shown in FIG. 1, the carrier 4 comprises a specular reflecting surface 8. In the embodiment shown in FIG. 1, the specular reflecting surface 8 is provided on the portion of the carrier surface arranged between the attachment portions of the flexible PCB 2. By providing such a specular reflecting surface 8, each of the elongated light sources 3 being in the shape of a circular arc in a manner disclosed above is reflected by the reflecting surface 8, thus creating a closed loop 9. Thus, the LED light unit 1 comprising such a specular reflecting surface 8 will have an enhanced spiral-shaped appearance. In order to improve the spiral-shaped appearance of the LED light unit 1 even further, the specular reflecting surface 8 of the carrier is concave.

Thus, according to the present invention, the LED light unit 1 will be perceived as comprising a LED filament having a spiral shape, since each of the elongated light sources 3 will be arranged as a circular arc. On the other hand, the assembly of the LED light unit 1 of the present invention is significantly simplified and the cost is reduced compared to providing a true spiral.

Figure 2A:
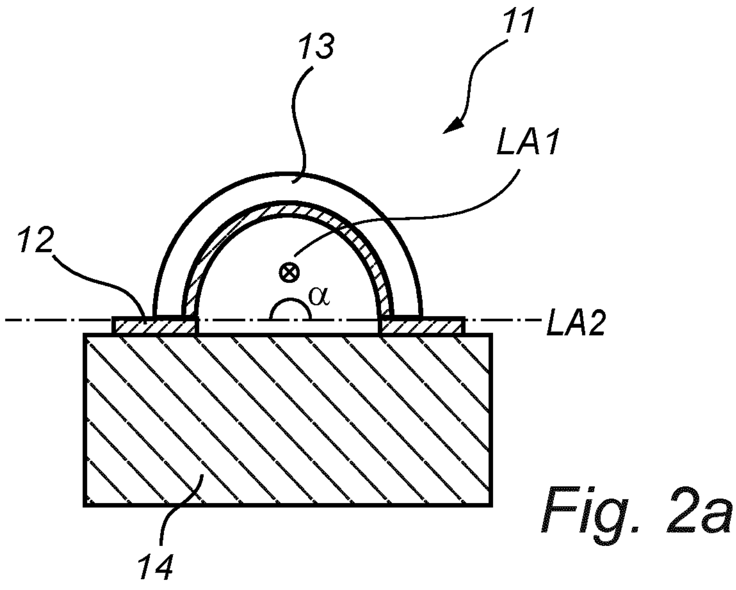
FIGS. 2*a*-2*b* is a side view of a LED light unit according to various exemplifying embodiments of the present invention.
Figure 2B:
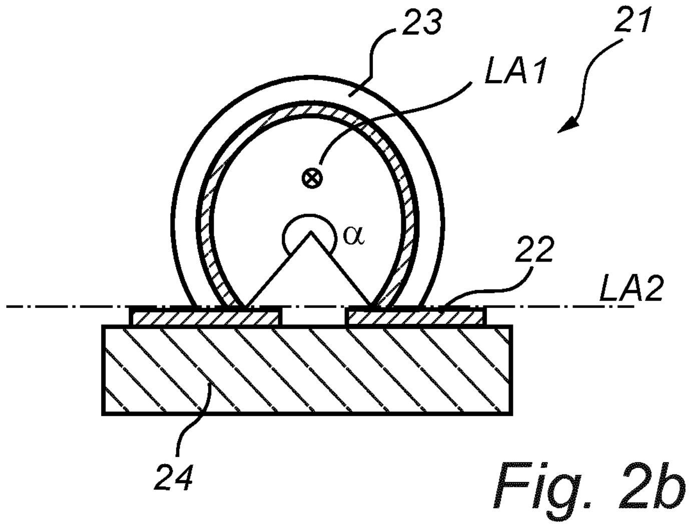

FIGS. 2*a* and 2*b* are schematic views of a cross-section of two different embodiments of LED light units 11, 21 according to the present invention. FIG. 2*a* depicts a LED light unit 11 comprising a flexible PCB 12 having a first longitudinal axis LA1 and one of the plurality of the elongated light sources 13 having a second longitudinal axis LA2. The LED light unit 11 further comprises a carrier 14, wherein the flexible PCB 12 is bent along the first longitudinal axis LA1 such that the elongated light source 13 is arranged in the shape of a substantially circular arc, and wherein the flexible PCB 12 is subsequently attached to the carrier 14. As may be seen in FIG. 2*a*, the central angle $\alpha$ of a circular sector defined by the circular arc is 180° ($\pi$ radian).

FIG. 2*b* depicts another embodiment of the LED light unit 21 comprising a flexible PCB 22 having a first longitudinal axis LA1 and one of the plurality of the elongated light sources 23 having a second longitudinal axis LA2. The LED light unit 21 further comprises a carrier 24, wherein the flexible PCB 22 is bent along the first longitudinal axis LA1 such that the elongated light source 23 is arranged in the shape of a substantially circular arc, and wherein the flexible PCB 22 is subsequently attached to the carrier 24. As may be seen in FIG. 2*b*, the central angle $\alpha$ of a circular sector defined by the circular arc is approximately 280° ($1{,}6 \cdot \pi$ radian).

Figure 3A:
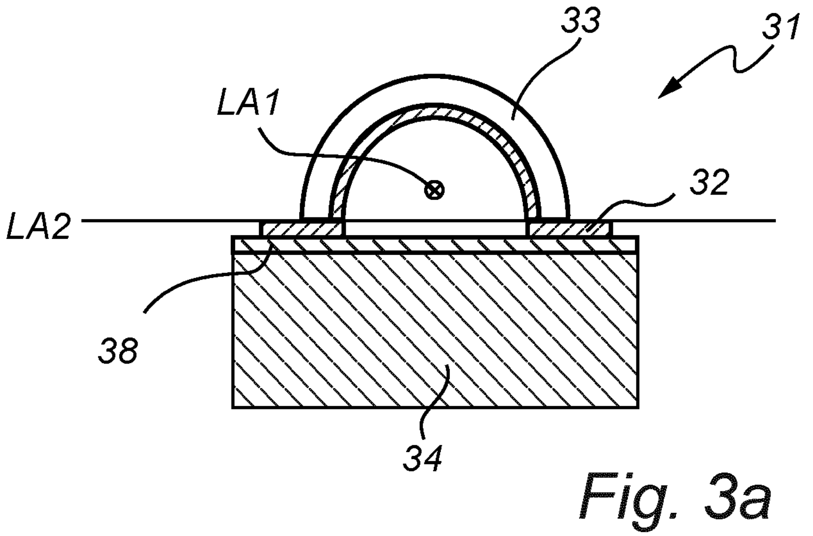
FIGS. 3*a*-3*c* are schematic views of a LED light unit according to further embodiments.
Figure 3B:
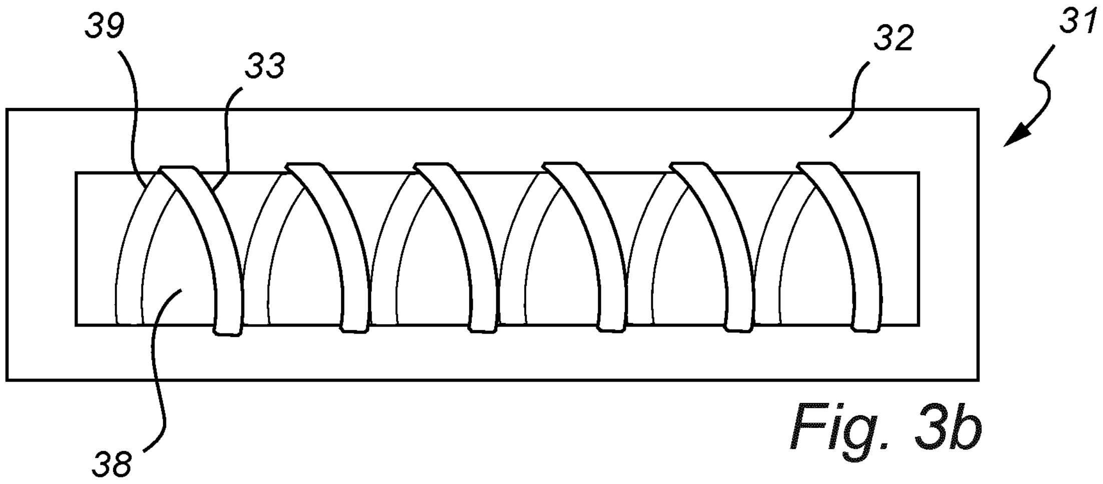

In FIGS. 3*a* and 3*b*, a cross-sectional and top view, respectively, of another embodiment of the LED light unit is illustrated. The LED light unit 31 comprises a flexible PCB 32 having a first longitudinal axis LA1 and one of the plurality of the elongated light sources 33 having a second longitudinal axis LA2. The LED light unit 31 further comprises a carrier 34, wherein the flexible PCB 32 is bent along the first longitudinal axis LA1 such that the elongated light source 33 is arranged in the shape of a substantially circular arc, and wherein the flexible PCB 32 is subsequently attached to the carrier 34. The carrier 34 further comprises a specular reflecting surface 38 to which the flexible PCB 32 is attached. By providing such a specular reflecting surface 38, each of the elongated light sources 33 being in the shape of a circular arc in a manner disclosed above is reflected by the reflecting surface 38, thus creating a closed loop 39, as shown in FIG. 3*b*. Thus, the LED light unit 31 comprising such a reflecting surface 38 will have an enhanced spiral-shaped appearance.

Figure 3C:
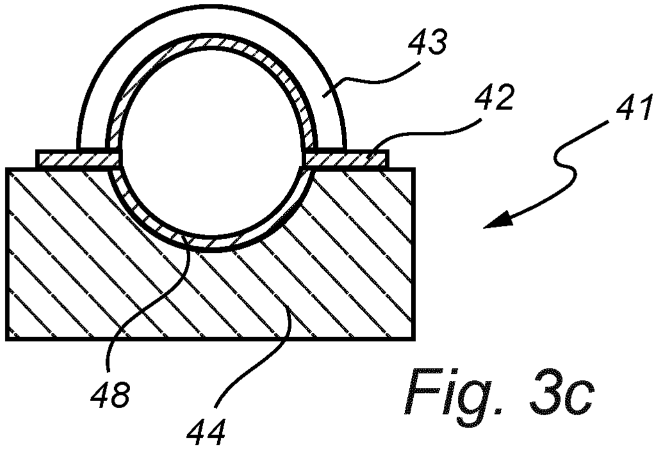

FIG. 3*c* shows yet another embodiment of the LED light unit 41, wherein the specular reflecting surface 48 of the carrier 44 is concave. Thus, the spiral-shaped appearance of the LED light unit 41 even further improved.

Figure 4A:
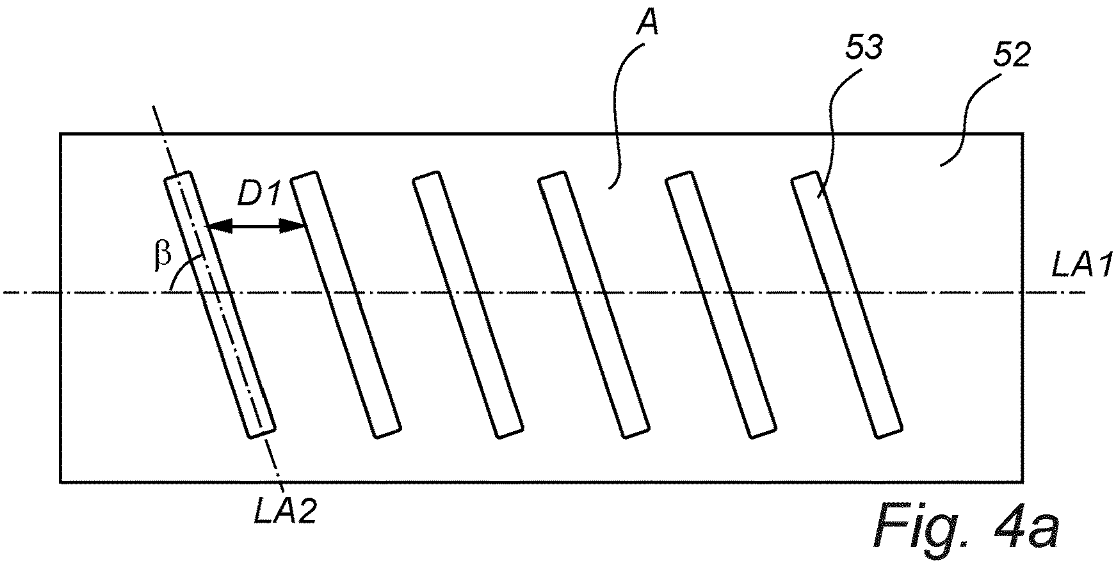
FIGS. 4*a*-4*c* is a schematic view of a manufacturing process of a LED filament according to the present invention.
Figure 4B:
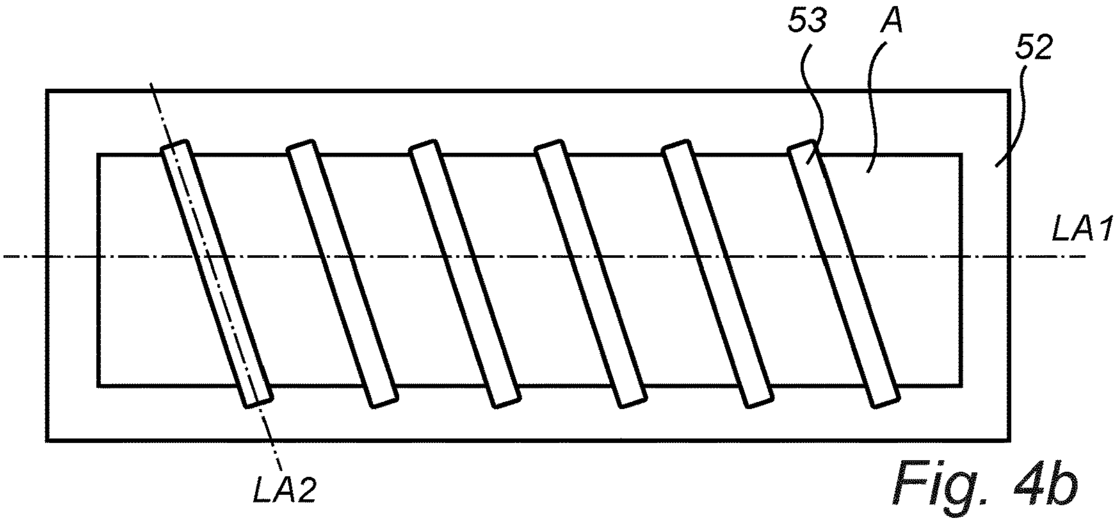
Figure 4C:
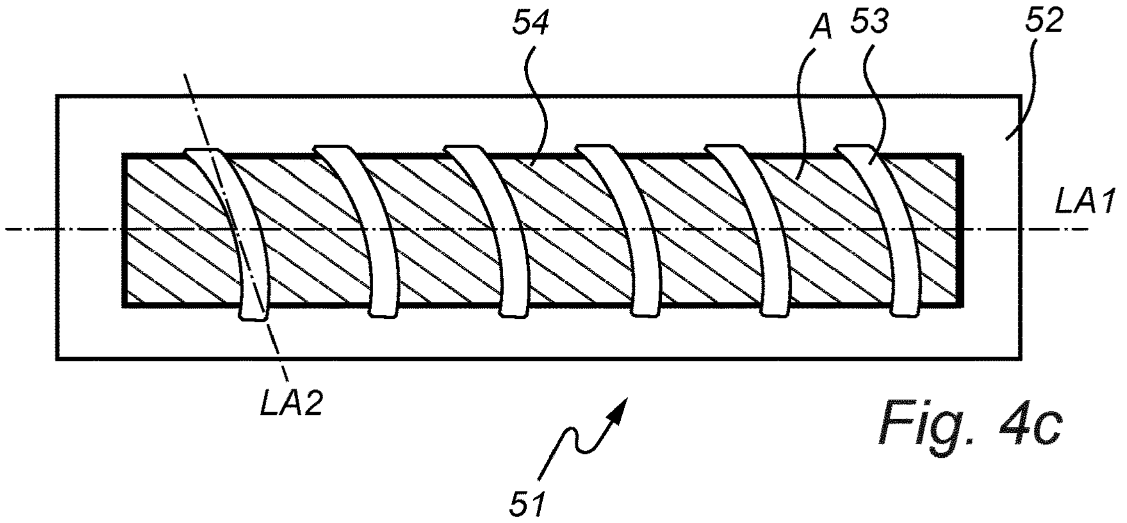

FIGS. 4*a*-4*c* depict a method of manufacturing a LED light unit 51 for providing LED light according to present invention. FIG. 4*a* shows step a) of providing a flexible PCB 52 having a first longitudinal axis LA1, step b) of providing a plurality of elongated light sources 53 each having a second longitudinal axis LA2, and step c) of arranging the plurality of elongated light sources 53 on the flexible PCB 52 such that none of the second longitudinal axes LA2 of the plurality of elongated light sources 53 is parallel to the first longitudinal axis LA1 of the flexible PCB 52. In the particular embodiment shown in FIG. 4*a*, the angle $\beta$ between each of the second longitudinal axes LA2 of the elongated light sources 53 and the first longitudinal axis LA1 of the flexible PCB 52 is approximately 70°. As may be seen in FIG. 4*a*, the plurality of the elongated light sources 53 are arranged on the flexible PCB 52 such that they are parallel to each other.

Each two adjacent light sources 53 are arranged at a distance D1 from each other, such that a plurality of spacing areas A is formed on the flexible PCB 52. The distance D1 between each two adjacent elongated light sources 53 is constant. Such an arrangement further augments the spiral-like appearance of the LED light unit 51.

As shown in FIG. 4*b*, the spacing areas A formed on the flexible PCB 52 between each two elongated light sources 53 are made transparent by removing the PCB material in the spacing areas, i.e. forming cut-outs between each two adjacent light sources 53.

Finally, FIG. 4*c* illustrates step d) of providing a carrier 54, step e) of bending the flexible PCB 52 along its longitudinal axis LA1 such that each of the elongated light sources 53 is arranged in the shape of a substantially circular arc, and step f) of at least partially attaching the flexible PCB 52 to the carrier 54. As may be seen in FIG. 4*c*, each circular arc 53 is perpendicular to the plane of the carrier 54.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention. While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A LED light unit for providing LED light, said LED light unit comprising:

- a flexible printed circuit board (PCB) having a first longitudinal axis,
- a plurality of elongated light sources each having a second longitudinal axis, said plurality of elongated light sources being arranged on said flexible PCB such that none of the second longitudinal axes of said plurality of elongated light sources is parallel to said first longitudinal axis of said flexible PCB, said elongated light sources being arranged at a constant distance from each other, a spacing area being formed in said flexible PCB between each two elongated light sources, said spacing area being transparent due at least in part to removal of said flexible PCB in said spacing areas, and at least one of said elongated light sources having an encapsulant comprising a light scattering material configured to scatter LED light, and a carrier, wherein said flexible PCB is bent along said first longitudinal axis such that each of said elongated light sources is arranged in the shape of a substantially circular arc, wherein said flexible PCB is subsequently at least partially attached to said carrier, and wherein said carrier comprises a specular reflecting concave surface.

2. The LED light unit according to claim 1, wherein said elongated light sources being arranged on said flexible PCB are parallel to each other.

3. The LED light unit according to claim 1, wherein each of said circular arcs is lying in a plane being substantially perpendicular to the plane of said carrier.

4. The LED light unit according to claim 1, wherein a central angle of a circular sector defined by said substantially circular arc is at least 180 degrees.

5. The LED light unit according to claim 4, wherein said central angle of a circular sector defined by said substantially circular arc is between 200 and 360 degrees.

6. The LED light unit according to claim 1, wherein an angle between each of said second longitudinal axes of said elongated light sources and said first longitudinal axis of said flexible PCB is between 5 and 85 degrees.

7. The LED light unit according to claim 1, wherein each of said elongated light sources comprises a plurality of light emitting diodes (LEDs) providing LED light.

8. The LED light unit according to claim 1, wherein the encapsulant of the at least one elongated light source further comprises a luminescent material configured to at least partly convert LED light into converted light.

9. A lighting device comprising a LED light unit according to claim 1.

10. A method of manufacturing a LED light unit for providing LED light, said method comprising the steps of:

a) providing a flexible printed circuit board (PCB) having a first longitudinal axis;

b) providing a plurality of elongated light sources each having a second longitudinal axis, at least one of said elongated light sources having an encapsulant comprising a light scattering material configured to scatter LED light;

c) arranging said plurality of elongated light sources on said flexible PCB such that (i) none of the second longitudinal axes of said plurality of elongated light sources is parallel to said first longitudinal axis of said flexible PCB, (ii) each of said elongated light sources has a constant distance from each other, and (iii) a spacing area is formed in said flexible PCB between each two elongated light sources by removing said flexible PCB in said spacing areas to cause the spacing area to be transparent;

d) providing a carrier comprising a specular reflecting concave surface;

e) bending said flexible PCB along said first longitudinal axis such that each of said elongated light sources is arranged in the shape of a substantially circular arc;

f) at least partially attaching said flexible PCB to said carrier.

* * * * *